May 21, 1929. L. G. COPEMAN 1,714,079
BALLOON CONSTRUCTION
Filed Sept. 14, 1927
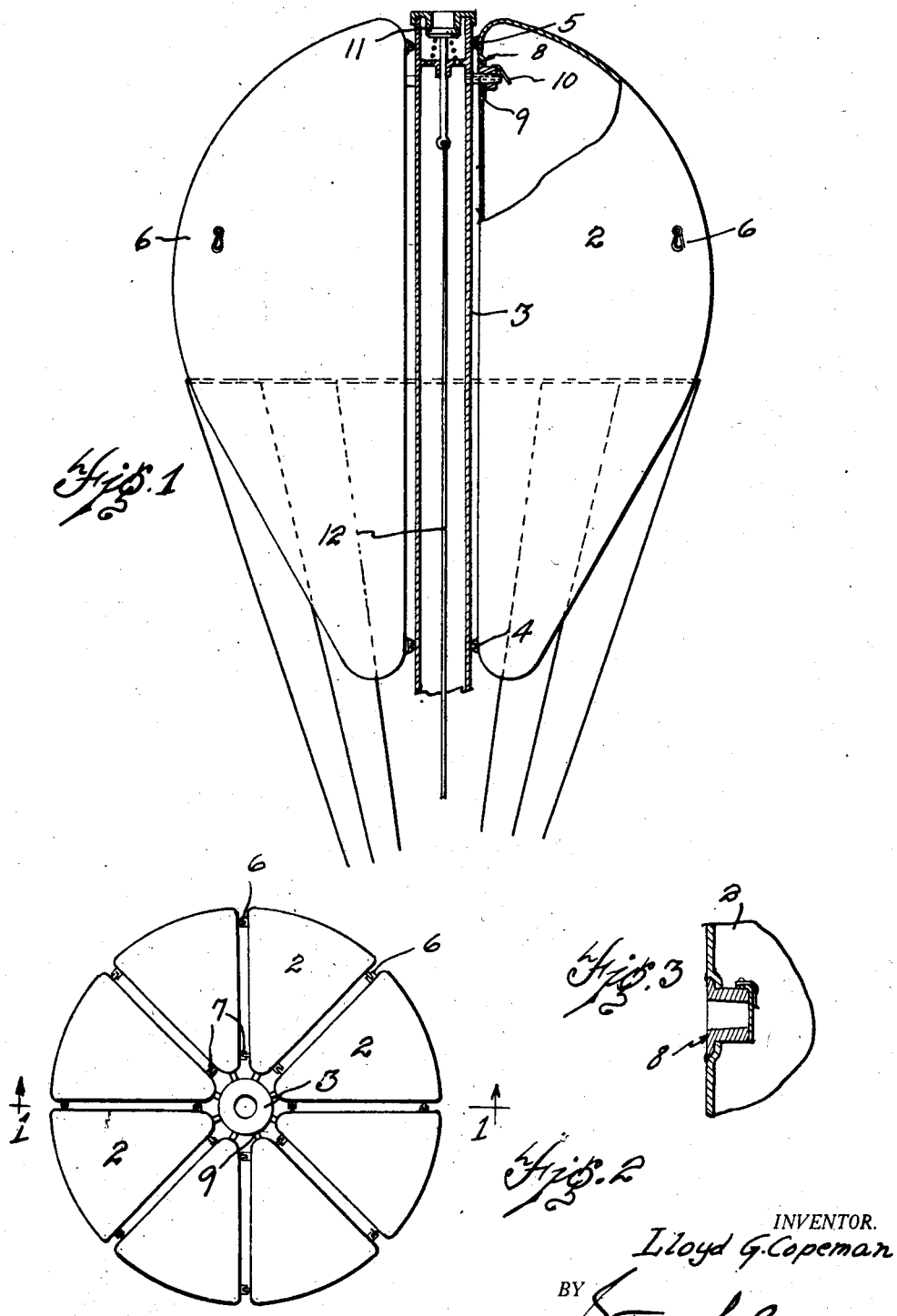
INVENTOR.
Lloyd G. Copeman
BY
Stuart C. Barnes
ATTORNEY.

Patented May 21, 1929.

1,714,079

UNITED STATES PATENT OFFICE.

LLOYD G. COPEMAN, OF FLINT, MICHIGAN.

BALLOON CONSTRUCTION.

Application filed September 14, 1927. Serial No. 219,412.

This invention relates to balloon construction and has to do particularly with the design and fabrication of relatively small balloons of a type known as "jumping balloons."

Relatively small balloons of the type known as "jumping balloons" have recently come into vogue in several foreign countries. These balloons of relatively small capacity, usually around seven thousand cubic feet, have been utilized for carrying the single occupant several hundred feet in the air and usually several miles in distance. However, when the balloon has once alighted at the end of the trip it has been necessary to release practically all of the gas contained therein so that it can be loaded and hauled back to the hangar or place of starting. This necessity of losing practically all of the gas makes the sport of balloon jumping very expensive and also makes the sport a somewhat tedious one as it requires some time and work in refilling the balloon each time of the trip.

It is the object of the present invention to provide a jumping balloon which is compact and efficient in design but which is so constructed as to avoid the necessity of releasing the gas at the end of the trip. More specifically, the present invention contemplates the provision of a balloon which is made up of sections which can be easily and quickly disassembled and loaded on a suitable conveyance to be returned to the hangar or place of starting, where they can be reassembled with the loss of little, if any, gas.

Fig. 1 is a sectional view taken on line 1 of Fig. 2 and showing the preferred manner of securing the balloon sections to the central appendix.

Fig. 2 is a plan view of the structure illustrated in Fig. 1 and showing the general manner of securing the balloon sections together and to the central appendix.

Fig. 3 is a fragmentary detail view illustrating one form of valve for connecting the balloon sections to the appendix.

In illustrating the present invention I have shown my balloon as being of standard shape and type, but it may be formed in any desired shape and in any desired manner and still come within the present invention as being a sectional balloon.

The balloon in its assembled relation, as shown in Figs. 1 and 2, is preferably pear shape and may be generally designated 1. This balloon may best be described as being divided into sections similar to the sections of an orange, as particularly shown in Fig. 2, and such sections may be designated 2. I preferably divide the balloon into six or eight sections but it will be readily understood that any number of sections may be utilized in accordance with the size and shape of the balloon, and the particular territory through which the balloon is to be conveyed when disassembled.

Each section 2 is secured to a common standpipe or appendix 3 which in the present embodiment is preferably a cylinder of light, thin metal, although it may be formed of any material. The sections 2 may be secured to this appendix 3 by means of suitable fastener devices 4 and 5 which are preferably of such construction as to be quickly attachable or detachable. The sections 2 are preferably secured to each other near their outer circumference by means of suitable connecting means 6, and they also may be connected adjacent their inner ends by means of suitable connecting means 7, although it will be obvious that the latter connecting means are not essential in obtaining a compact construction.

Each section 2 is provided, preferably adjacent its upper side, with a suitable valve or inlet 8. Each valve is adapted to receive a suitable conduit or valve outlet 9 secured to the appendix 3 at the upper end thereof. Each conduit 9 is integrally secured to the conduit 3 and so spaced as to register with the inlet valves 8 of each section 2 when such sections are assembled in position, as shown in Fig. 2. A suitable flap or valve 10 may be secured adjacent the inner end of each valve inlet 8 whereby when the balloon sections are removed from the appendix such flap will automatically close to prevent loss of gas from the particular balloon section.

Due to the securing of the conduits 9 to the appendix 3 such appendix serves as a common supply medium for each balloon section, and for this reason a relief valve 11, which is controlled by a suitable cord 12, is provided, which may be readily controlled by the occupant of the balloon. When the balloon sections are assembled as shown in Fig. 1 it will be obvious that the common relief valve 11 will control the exhausting of gas from all the balloon sections as well as from the appendix 3.

The balloon sections having been inflated and ready for use, as shown in Figs. 1 and 2, the flight may be started in the usual manner and controlled in the usual manner with the help of the common relief valve 11. At the termination of the flight each separate balloon section 2 may be unhooked from its adjacent section and from the appendix 3, and the valve 8 removed from the conduit 9 whereby the flap 10 will close to seal the gas within the balloon section. As each section 2 is removed the conduits 9 may be plugged to prevent the escape of gas from the other sections during disassembly, or the conduits 9 may be provided with suitable valves as well as the appendix 3 whereby they can be closed and the balloon sections 2 removed at will and loaded upon the conveyance to be returned to the proper place. The balloon being formed in sections, these may be easily loaded upon a truck or small trailer to be conveyed along the road without danger of the sections being torn by trees or other projecting elements which would be in the way of even a relatively small balloon of seven thousand cubic feet capacity. The balloon sections are then returned to the hangar or place of starting where they may be reassembled when desired and any small amount of gas lost can be replaced with a minimum amount of time and space.

It will be understood that the netting around the balloon may be easily removed to facilitate disassembly whenever desired.

What I claim is:

1. A jumping balloon, comprising in combination, a common central appendix, a plurality of buoyant bodies arranged circumferentially around the appendix, and means secured to each buoyant body for detachably and independently connecting the buoyant bodies to the common appendix and to each other.

2. A jumping balloon, comprising in combination, a plurality of buoyant bodies, means secured to each buoyant body for detachably securing said bodies to a common appendix and to each other, and a common means for controlling a supply of gas to and the exhausting of gas from said buoyant bodies.

3. A jumping balloon, comprising in combination, a common appendix, a relief valve for said appendix, a plurality of independent buoyant bodies positioned around said appendix, means for detachably securing the buoyant bodies to each other and to the said appendix, and means for independently connecting the supply of gas to each buoyant body to said common appendix.

4. A jumping balloon, comprising in combination, a cylindrical central appendix formed of metal, a plurality of buoyant bodies positioned around said appendix and detachably secured thereto, an automatically closing valve for each buoyant body, and conduits leading from said appendix for detachably engaging said valves.

In testimony whereof I affix my signature.

LLOYD G. COPEMAN.